(No Model.) 7 Sheets—Sheet 1.

W. WEBBER.
COIN CONTROLLED GAS VENDING MACHINE.

No. 591,514. Patented Oct. 12, 1897.

WITNESSES:
Lewis Burchard
Paul Johad

INVENTOR
Wesley Webber
BY H. A. West
ATTORNEY

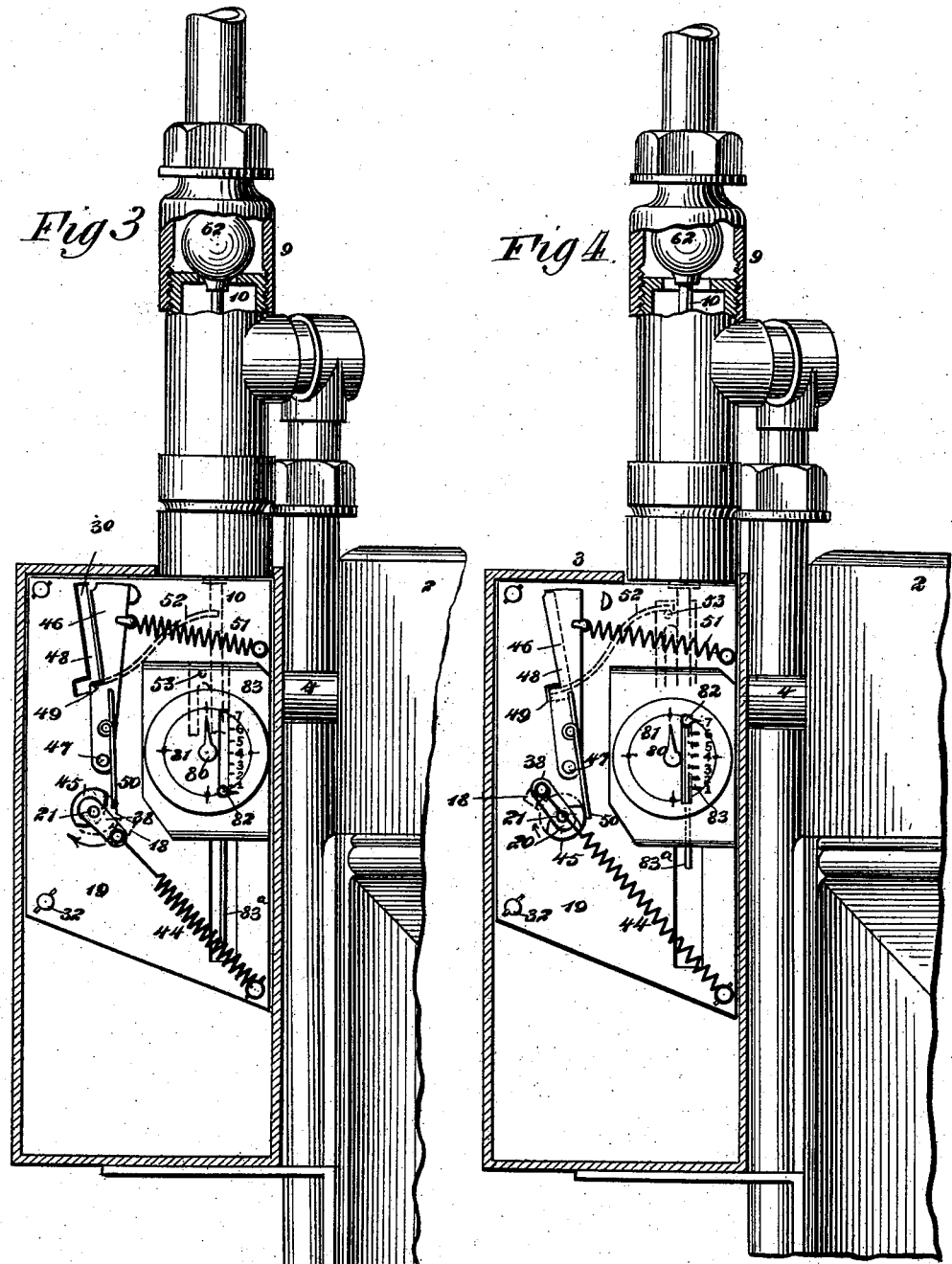

(No Model.) 7 Sheets—Sheet 3.
W. WEBBER.
COIN CONTROLLED GAS VENDING MACHINE.
No. 591,514. Patented Oct. 12, 1897.

WITNESSES:

INVENTOR
Wesley Webber
BY H. A. West
ATTORNEY (No Model.)  7 Sheets—Sheet 4.

W. WEBBER.
COIN CONTROLLED GAS VENDING MACHINE.

No. 591,514.  Patented Oct. 12, 1897.

WITNESSES:

INVENTOR
Wesley Webber
BY H. A. West.
ATTORNEY (No Model.) 7 Sheets—Sheet 5.
W. WEBBER.
COIN CONTROLLED GAS VENDING MACHINE.
No. 591,514. Patented Oct. 12, 1897.
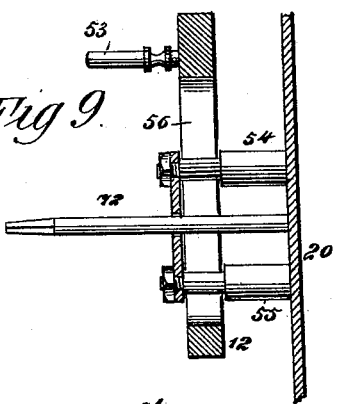
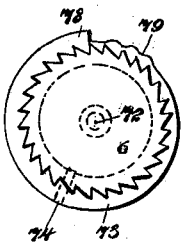
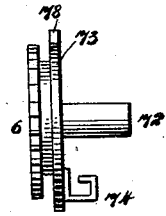
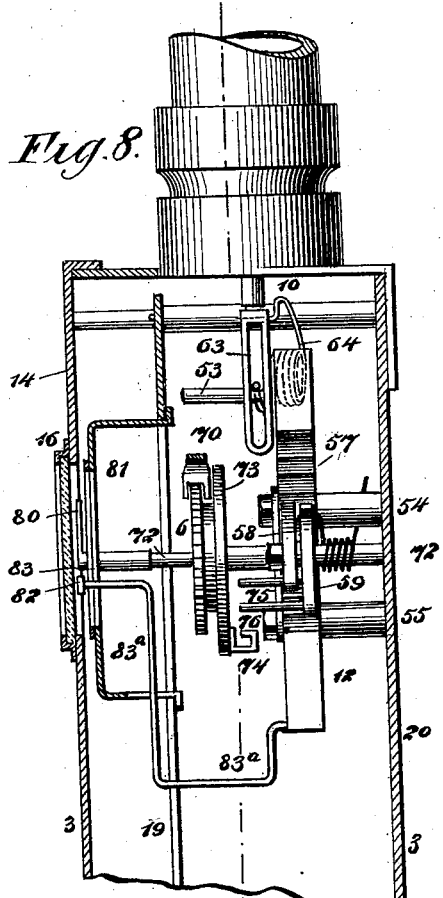
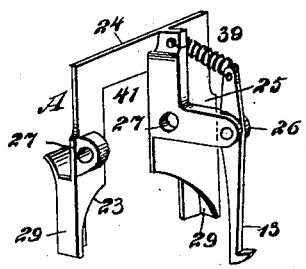
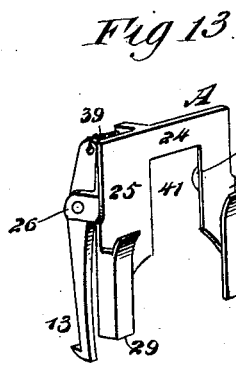
WITNESSES:
INVENTOR
Wesley Webber
BY H. A. West
ATTORNEY (No Model.)  7 Sheets—Sheet 6.

W. WEBBER.
COIN CONTROLLED GAS VENDING MACHINE.

No. 591,514. Patented Oct. 12, 1897.

WITNESSES:

INVENTOR
Wesley Webber
BY H. A. West
ATTORNEY (No Model.)

7 Sheets—Sheet 7.

W. WEBBER.
COIN CONTROLLED GAS VENDING MACHINE.

No. 591,514.

Patented Oct. 12, 1897.

WITNESSES:

INVENTOR
Wesley Webber
BY
H. A. West
ATTORNEY

UNITED STATES PATENT OFFICE.

WESLEY WEBBER, OF NEW YORK, N. Y.

COIN-CONTROLLED GAS-VENDING MACHINE.

SPECIFICATION forming part of Letters Patent No. 591,514, dated October 12, 1897.

Application filed August 26, 1896. Serial No. 603,987. (No model.)

*To all whom it may concern:*

Be it known that I, WESLEY WEBBER, a citizen of the United States, and a resident of New York, in the county of New York and State of New York, have invented certain new and useful Improvements in Coin-Controlled Gas-Vending Machines, of which the following is a specification.

This invention relates to certain improvements in coin-controlled gas-vending apparatus designed to be attached to new or old meters; and the invention consists in the construction, arrangement, and combination of parts, as hereinafter described and claimed.

Reference is to be had to the accompanying drawings, in which—

Figure 1:
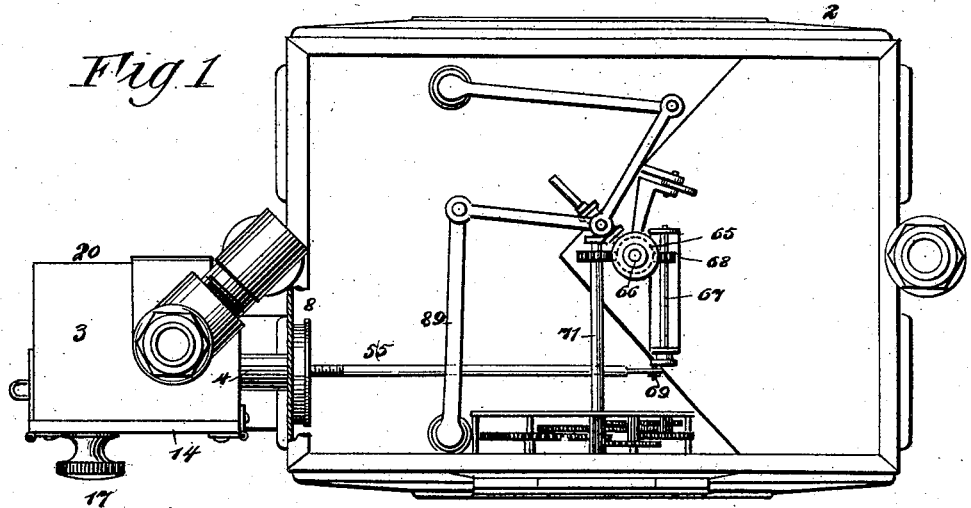
Figure 2:
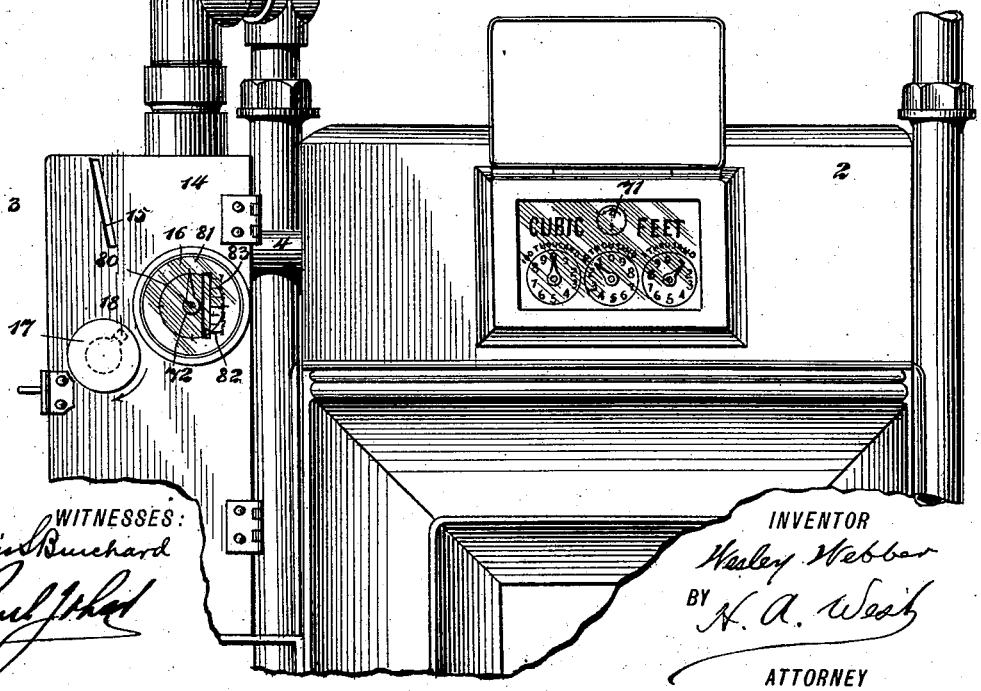
Figure 5:
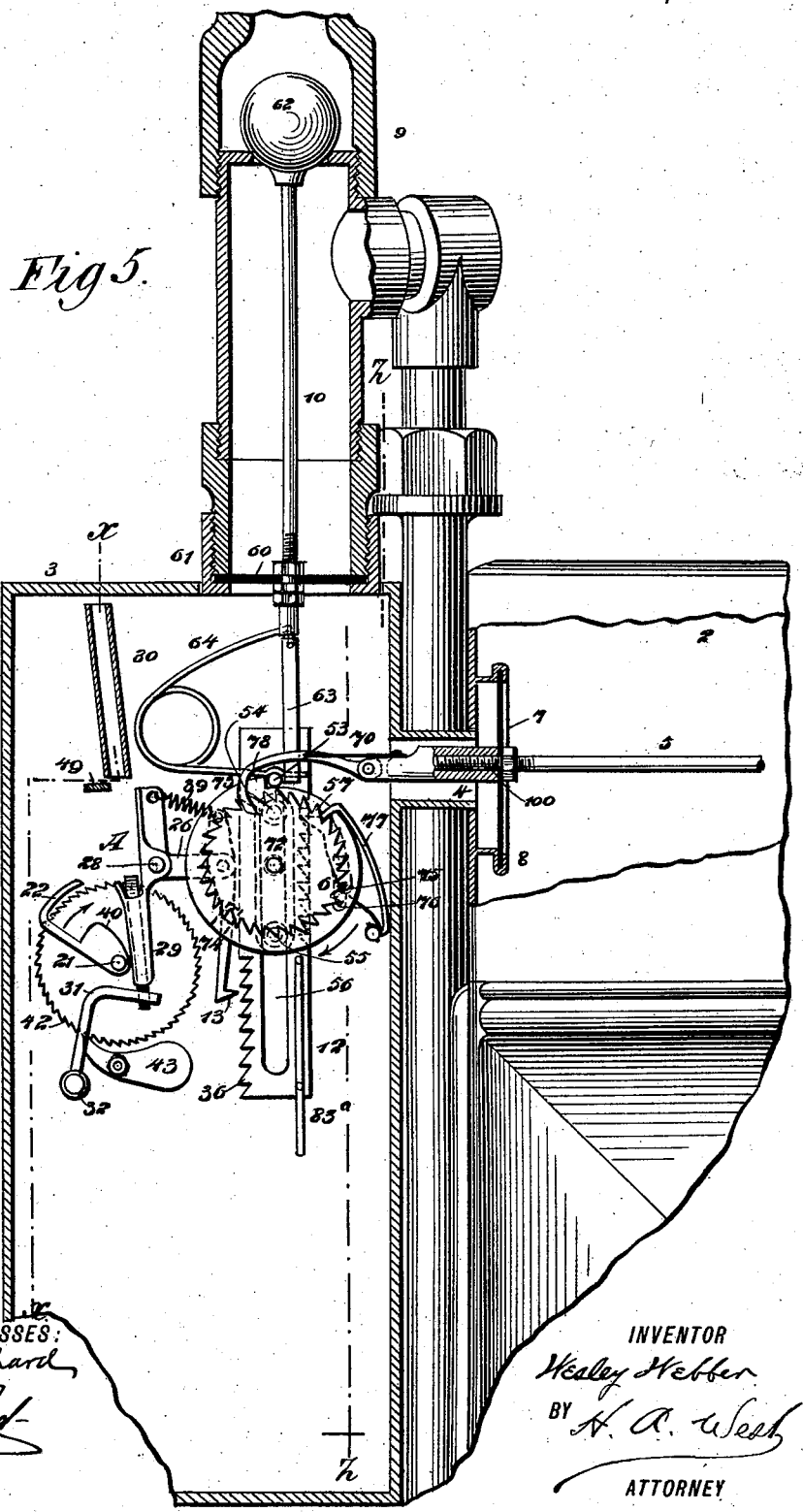
Figure 6:
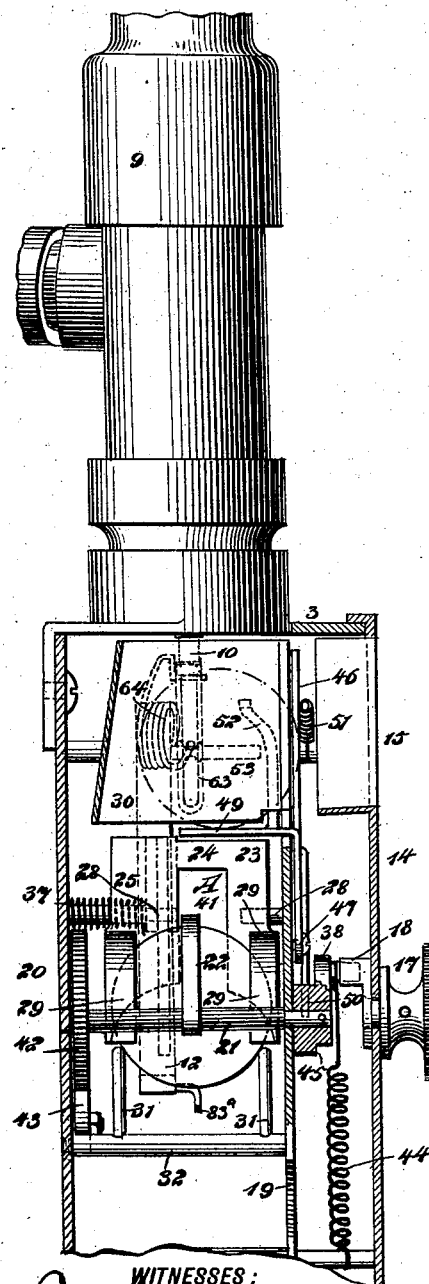
Figure 7:
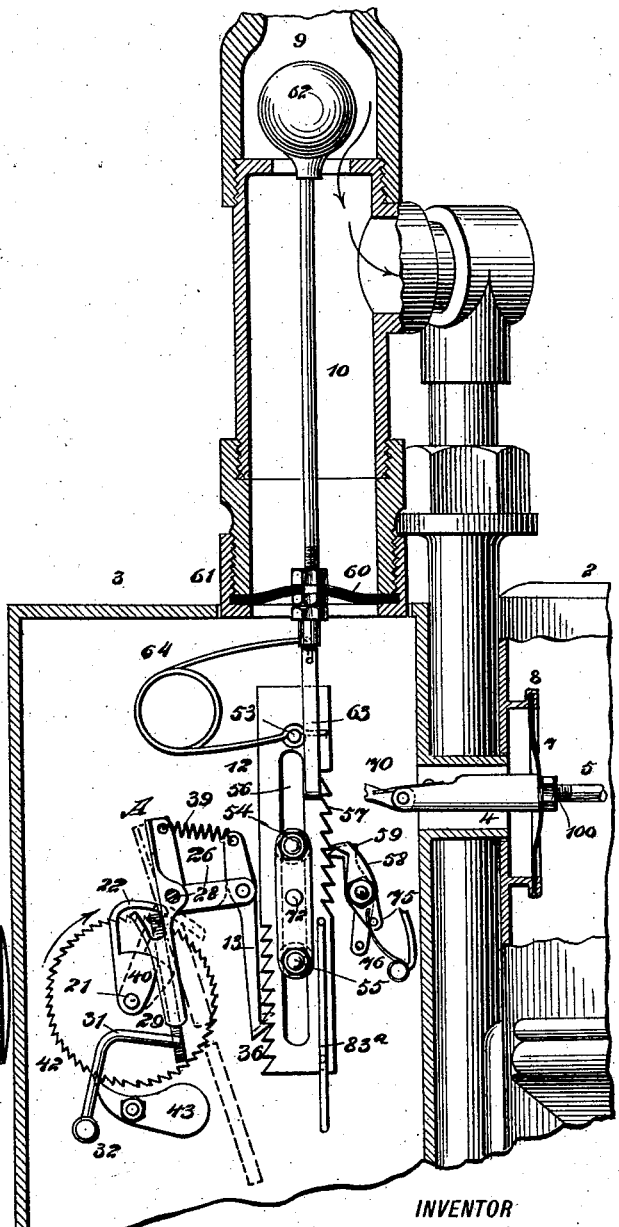
Figures 14, 15:
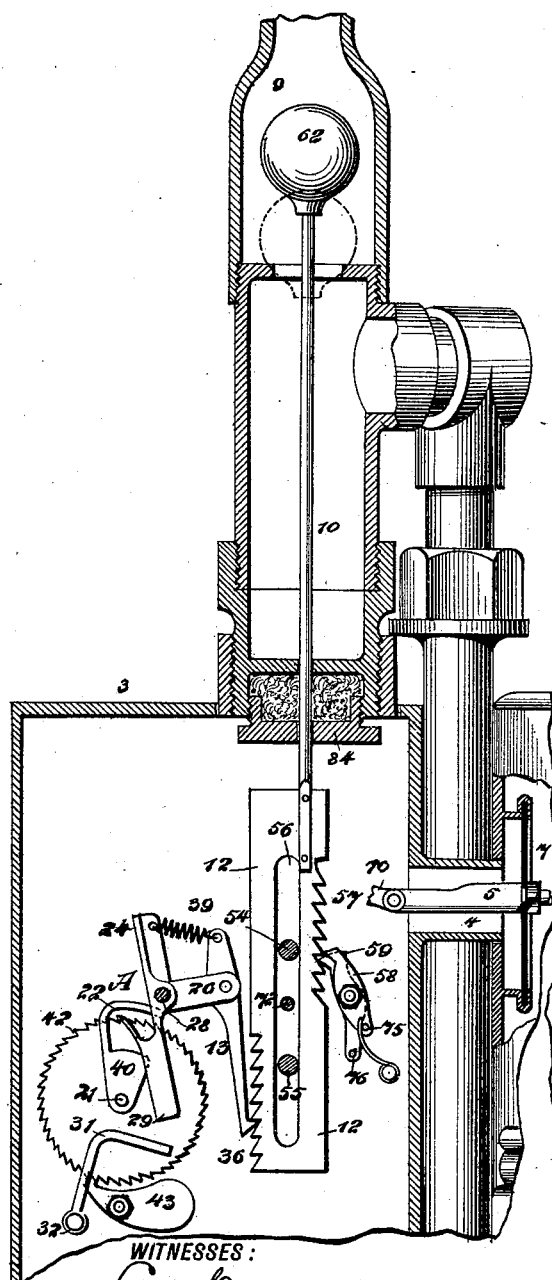
Figure 16:
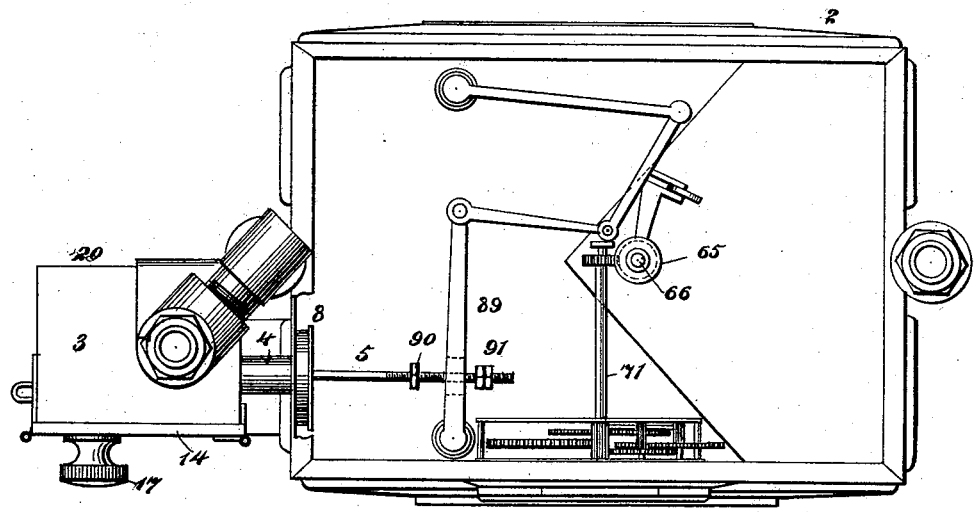
Figure 17:
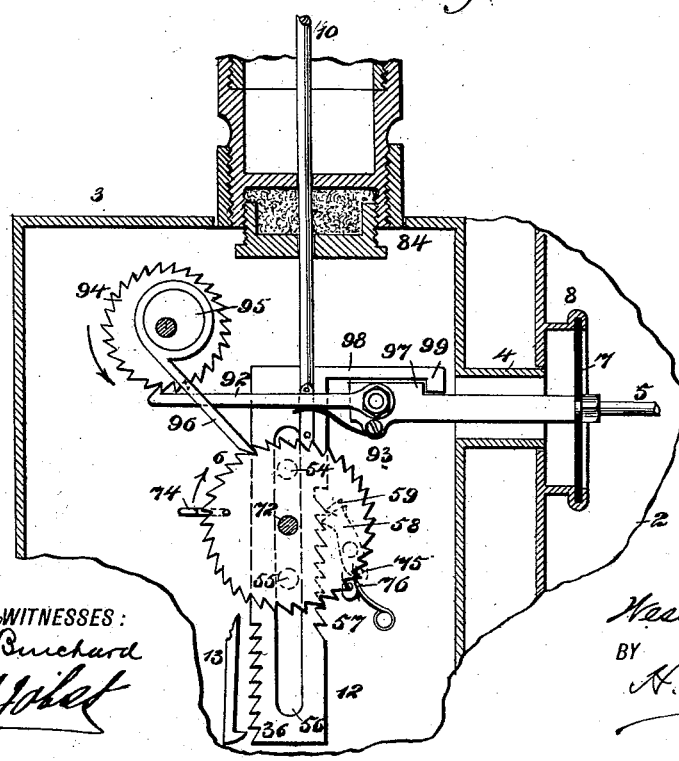

Figure 1 is a plan view of a gas-meter having my invention applied thereto, the top of the meter-casing being removed and a portion of the said casing broken away. Fig. 2 is a front elevation of a portion of a gas-meter and of a portion of a coin attachment, showing the several indices, the coin-slot, the valve-chamber, and the union pieces for connecting the valve-chamber with the gas-inlet pipe of the meter. Fig. 3 is a sectional elevation showing the mechanism attached to the inner front plate of the frame and showing the valve closed, the parts being in the position they assume before a coin is inserted. Fig. 4 is a similar view showing the parts in the position they occupy when seven coins, the limit number provided for in this instance, have been inserted and no gas has yet been delivered in exchange therefor, the crank 38, for purpose of illustration, being left in position to be acted upon by the spring 44, rather in position of rest, as shown in Fig. 3. Fig. 5 is an enlarged sectional elevation of my invention with the inner front plate of the frame removed. Fig. 6 is an enlarged transverse sectional elevation taken on the line *x x* of Fig. 5, the crank 38 and cam 45 being shown broken away. Fig. 7 is a sectional elevation on the line *y y* of Fig. 8. Fig. 8 is a transverse sectional elevation on the line *z z* of Fig. 5. Fig. 9 is an enlarged detail view, in transverse sectional elevation, (on the median line,) of the valve-controlling rack or meter-controlling rack, the back plate of the frame, the posts or guiding-studs, which sustain the valve-controlling rack, and the shaft for the units or metric wheel. Figs. 10 and 11 are respectively front and edge views of the units or metric wheel and the dimming cam or flange. Figs. 12 and 13 are respectively front and back perspective views of the coin-carrier. Fig. 14 is a sectional elevation, similar to Fig. 7, showing the valve-stem connected directly with the valve-controlling rack and passing through a stuffing-box instead of through a flexible diaphragm, as in Figs. 5 and 7. Fig. 15 is a sectional elevation showing a modification wherein the valve-controlling rack is circular. Figs. 16 and 17 illustrate modified means for transmitting motion from the meter to the coin-controlled mechanism, wherein both a valve and a lock or stop for the meter mechanism are employed, Fig. 16 being a plan view and Fig. 17 a sectional elevation.

2 represents the meter-casing, and 3 the box or casing which incloses the coin-controlled mechanism, the latter casing being connected to the meter-casing by a tube 4 or other appropriate means. A rod or shaft 5, which is reciprocated by the meter mechanism, reaches from inside the meter-casing through the said tube 4 into the casing 3, and by its reciprocating movement rotates step by step the units or metric wheel 6 only in the direction of the arrow shown in Fig. 5. To prevent the escape of gas from the meter-casing, the rod 5 is, by preference, held gas-tight in a flexible diaphragm 7, mounted gas-tight at its edges in a metal ring 8.

On the top of the box or casing 3 is mounted a valve-chamber 9, into which reaches a valve-stem 10, connected inside of the box or casing 3 to a valve-controlling rack 12, which is allowed to move in the valve-closing direction by the operation of the units or metric wheel 6, as hereinafter described, and which is operated in the valve-opening direction by the pawl 13 of the coin-carrier A, as hereinafter described.

14 represents the door of the box or casing 3, which door may be either locked or sealed, and which is formed with a coin-slot 15 and a glazed dial or index opening 16, and which has journaled therein a crank or knob 17, provided on the inner surface of the door with an off-center projection 18 for operating indirectly, as hereinafter described, the coin-carrier A, which is pivoted between the inner front plate 19 and the back 20 of the box 3. This coin-carrier, in addition to the function of operating the valve-controlling rack 12, prevents fraudulent operation of the mechanism and occupies a position between the said valve-controlling rack and a shaft 21, alined with the axis of the knob 17, which said shaft is provided with a hook 22 for operating the coin-carrier and dislodging the coin therefrom, as hereinafter described.

The preferred construction of the coin-carrier is shown clearly in Figs. 12 and 13. It comprises, essentially, the three sides 23 24 25 of a rectangle and the lever 26, in which the above-mentioned pawl 13 is pivoted. The side piece 23 and the lever 26 are formed with alined journals 27 27, by which the coin-carrier is mounted to turn upon two alined gudgeons 28 28. (Shown in dotted lines in Fig. 6.) The side pieces 23 25 are formed with flanged channels 29 29, which serve, as shown in Figs. 5 and 6, to receive the coin when it is permitted to drop therein from the primary coin-receiving chamber 30. The normal or first position of the coin-carrier A is shown in Fig. 5. Its second position is shown in full lines in Fig. 7. Its third position is shown in dotted lines in Fig. 7. When in its normal or first position, the channels 29 29 stand immediately above two bent arms 31 31, fastened on the post 32. These arms serve to support a coin proper to the machine in its operative position, as shown in Figs. 5 and 6, whereas a coin too small for the machine will drop at once between the arms into the cash-receptacle below without remaining to form an operative part of the mechanism, as hereinafter described.

It will be noticed from Fig. 5 that when the coin-carrier A is in its first or normal position the pawl 13 is held out of engagement with the adjacent teeth 36 of the valve-controlling rack 12 by a spring 37 on one of the gudgeons 28, so that the said pawl cannot interfere with the valve-closing movement of the rack, and from Fig. 7 that in A's second position (that shown in full lines) the said pawl has become engaged with the said teeth, and in its third position (that shown in dotted lines in Fig. 7) the said pawl has lifted the rack one tooth or moved it one tooth in the valve-opening direction and discharged the coin (also shown in dotted lines) into the cash-receptacle at the bottom of the box or casing 3. These three positions are the result of the rotation of the said shaft 21 and hook 22, acting in conjunction with the coin, knob 17, off-center projection 18, and the crank 38, secured to the front end of the shaft 21. The pawl 13 projects above the lever 26, and a spring 39 connects said upwardly-projecting end with the coin-carrier. The revolution of the hook 22 and the cam 40, which is a part of the hook and which bears against the coin when the coin is in the position shown in Figs. 5 and 7, causes the coin when held in the channels 29 29 to shift the coin-carrier A forward, thus engaging the pawl 13 with the rack-teeth 36, and by a still further similar movement of the coin-carrier causes the lever 26 to lift the pawl 13 and the valve-controlling rack 12, as above indicated, thus opening the valve and admitting the gas to the meter.

It will be noticed from Figs. 6, 12, and 13 that the coin-carrier A is formed with a central space 41, which permits the hook and cam to turn inoperatively when no coin is in the flanges 29 of the carrier.

It will also be noticed from Fig. 7 that the hook 22 in the second and third positions of A overlaps the upper edge of the coin and serves not only to discharge the coin from the channels 29 after the coin has been shoved past the ends of the coin-discriminating supports 31, but also serves to prevent the fraudulent retention (past one operation) of the coin in operative position by the use of a string or adhesive material, or its withdrawal by any means.

Another method of fraudulently operating the machine is guarded against by separating the knob 17 from the shaft 21. For this purpose I employ the above-mentioned off-center projection 18 and crank 38 and connect to said crank a heavy spring 44, arranged as shown in Figs. 3 and 4. The projection 18 and crank 38 act complementally through one-half of a revolution of the knob 17—that is to say, the projection 18 (shown in dotted lines in Figs. 3 and 4) pushes the crank against the action of the spring 44 from the position shown in Fig. 3 in the direction of the arrow to that shown in Fig. 4 just past the line of shaft 21, whereupon the spring 44 suddenly completes the revolution independently of the knob, thus causing the purchaser to lose all control of the coin before it becomes a temporarily operative part of the mechanism to open the valve and rendering it impossible for the purchaser to hold the coin fixed in the position in which it opens the valve. The machine is thus automatic after a coin has been inserted and the knob turned to set the crank 38 in the position shown in Fig. 4.

On the shaft 21, or preferably on the crank 38, is formed a small cam 45, which in the revolution of the crank operates a plate or curtain 46, pivoted at 47 on the inner front plate 19, for closing the alined coin-slots 15 and 48, formed, respectively, in the door or cover 14 and the inner front plate 19. The said reciprocating curtain 46 is formed or provided with an arm 49, which normally closes the bottom of the primary coin-chamber 30, so that when a coin is inserted in said primary chamber 30 it will be retained therein and by its presence prevent the insertion of another coin until after the proper operation of the knob 17 by the purchaser. When the cam 45, acting against the finger 50 of the curtain 46, shifts the curtain from the position shown in Fig. 3 to that shown in Fig. 4, closing the coin-slots, it at the same time shifts the arm 49 and permits the coin to drop into the channels 29 29 of the coin-carrier A. The cam 45 is of such operative extent that it retains the curtain 46 across the slots until the crank 38 has been returned to its normal position, (that shown in Fig. 3,) whereupon the spring 51 will withdraw the curtain 46 from across the slots and replace the arm 49 in position to retain the next coin inserted in the primary coin-chamber 30. The function of the curtain 46 is therefore to prevent clogging the machine by the successive insertion of coins without a complete revolution of the crank 38, and the parts operated by it after each insertion.

Another function of the curtain 46 is to automatically close the coin-slots so as to prevent the insertion at any one time of more coins than the machine is constructed to receive at one time. This latter function is effected by means of an arm 52, (shown in dotted lines in Figs. 3, 4, and 6,) attached to the horizontal coin-retaining arm 49, above described. This arm is moved by a projection 53, attached to the valve-controlling rack 12 when the said rack has been moved by the pawl 13 in the valve-opening direction for the space of the last notch or tooth in the rack—that is to say, when the last of the number of coins which the machine is adapted to receive at any one time has been inserted the projection 53 will impinge against the arm 52, and by it the valve-controlling rack 12 will move the curtain 46 across the slots, as shown in Fig. 4, and hold it in that position till one coin's equivalent in gas has been consumed, when the arm and curtain will return to the position shown in Fig. 3.

The shaft 21, hook 22, cam 40, and crank 38 are prevented from backward movement by the ratchet 42 and pawl 43.

The valve-controlling rack 12 is held to slide freely upon and is guided by studs 54 55, which, by preference, pass through a longitudinal slot 56, formed in the rack, and is formed with a series of teeth or notches 36 on one of its sides and with a series of notches or ratchet teeth 57 on the opposite side. With these latter teeth two alternately-operating spring-pressed pawls or clicks 58 59 engage for holding the said rack at any position to which it may be lifted by the pawl 13, until said pawls are operated as an escapement by the rotation of the units or metric wheel 6, as hereinafter described.

As shown clearly in Figs. 5 and 7, the valve-stem 10 is connected gas-tight in a flexible diaphragm 60, held gas-tight at its edges in a gasket 61. The upper end of the valve-stem is connected to the valve 62, as here shown a ball-valve on a circular seat, a ball being preferred because its section, however presented to the seat, will always be circular, whereas a conical valve, if drawn to the seat in any other than the line of axis of the cone, would present an oval section to the seat, and hence not fit snugly.

In the form of construction shown in Figs. 5, 6, 7, and 8 the lower end of the valve-stem, which projects into the box or casing 3, is slotted, as shown at 63.

64 is a spring whose upper end is connected to the valve-stem and whose lower end rests in the lower end of the slot 63 when the valve-controlling rack is at its lowest point and the valve closed, as shown in Fig. 5. The length of the slot 63 must be equal to or greater than that of the series of teeth 36 and 57 of the valve-controlling rack. The arm 53 of the valve-controlling rack reaches out horizontally beneath the lower end of the spring 64 and serves as a support therefor whenever the said rack is lifted by the pawl 13. When the valve-controlling rack is lifted, say, one tooth, the spring 64 no longer rests at the end of the slot 63, but it rests upon the said arm 53, and hence the spring 64 becomes active and lifts the valve-stem 10 and valve 62 to the position shown in Fig. 7, and thus opens the valve and admits the gas to the meter. If more than one coin be inserted in the machine at any one time, the successive liftings of the valve-controlling rack lift the lower end of the spring 64 in the slot 63 without further opening the valve, gradually compressing the spring and storing power therein to facilitate the valve-closing movement of the rack as such power shall be subsequently released through the two spring-pressed pawls 58 59 acting as an escapement during the consumption of the gas purchased. Figs. 7 and 8 show the position of the spring in the slot after four coins have been inserted.

I have shown by the foregoing description how the first coin inserted serves to open the valve, and how a certain number of coins, depending upon the number of teeth provided on the valve-controlling rack, may be thereafter inserted. It now becomes necessary to describe the means and operation by which each coin's equivalent in gas is delivered through the meter and by which the valve is closed at the expiration of the consumption of the last coin's worth of gas, and also by which, shortly prior to such closing, warning thereof is given to the consumer in order to notify him that one or more coins should be again inserted. These functions are performed by power derived from the meter mechanism, as shown in Fig. 1, directly from the usual worm 65 on the king-shaft 66 through a small counter-shaft 67, worm-wheel 68, crank 69, crank-rod 5, and the pivoted spring-pressed claw or hook 70, which latter engages with the teeth of the units or metric or gas-counting or coin's-equivalent wheel 6, which wheel in the construction shown in the drawings is adapted to be rotated one tooth for each cubic foot of gas passed through the meter and to make one complete revolution for each coin's worth of gas passed through the meter.

In the construction shown in Fig. 1 the small worm-wheel 68, having half as many teeth as the worm-wheel on what is known as the "two-foot shaft" 71 of the meter-index, will make one revolution for each cubic foot of gas passed through the meter. Hence the crank-rod 5 will receive one throw for each cubic foot of gas passed through the meter, and as the crank 69 is made of such a length that the throw of its rod 5 shall be more than one tooth and less than two teeth on the metric wheel 6 it is obvious that each cubic foot of gas passed through the meter will cause the hook 70 to haul the metric wheel one tooth in the direction of the arrow. It is also obvious that if the crank 69 were placed directly on the two-foot shaft 71 each throw of the rod 5 and each tooth of the metric wheel would represent two cubic feet of gas, while by increasing the number of teeth on the worm-wheel 68 the number of cubic feet of gas to be represented by one tooth on the metric wheel may be varied. It is also obvious that the claw 70 may be arranged to push the wheel 6 in a direction opposite to that of the arrow instead of pulling it, as shown.

The metric or units or gas-counting or coin's-equivalent wheel 6 is mounted on a shaft 72, fixed in the back of the box or casing 3, and is formed or provided with a cam-flange 73, which latter carries a pawl-operating projection 74 for successively engaging the horizontal arms 75 76, and thereby successively tripping the spring-pressed pawls or clicks 58 59. As shown clearly in Figs. 7 and 8, the toe of the pawl 58 is on a higher level than the toe of the pawl 59, and its arm 75 is on a higher level than the arm 76 of the pawl 59. When the pawl 58 engages with a tooth of the valve-controlling rack 12, the pawl 59 will rest inoperatively in the same notch. When the pawl 58 is disengaged by the projection 74 in the course of the rotation of the units-wheel 6, the rack drops upon the pawl 59, which then becomes operative, and the pawl 58 rests against the outer inclined surface of the same tooth above the notch, as shown in Fig. 7, and when a moment later the said projection 74 trips the pawl 59 the rack is permitted to drop one notch and is caught by the pawl 58. This operation is repeated once for each revolution of the metric wheel, and the two pawls thus alternately acting serve the purpose of an escapement, either pawl when in its operative position freely permitting the rack to be lifted or moved in the valve-opening direction, so that at no time and at no position do the pawls lock the valve-controlling rack against the movement imparted to it by the coin in the coin-carrier. The units or metric wheel 6 is locked against backward movement by pawl 77.

Let it now be supposed that gas has been passed through the meter for all the coins inserted excepting one, so that one coin, or its equivalent in gas, remains to the consumer's credit and so that the wheel 6 is to be revolved but once more and the rack 12 can drop but one tooth. At this time the arm 53 will rest upon the cam-flange 73 of the wheel 6 at the point of its greatest eccentricity, adjacent to and back of the shoulder 78, and in the course of the ensuing final revolution of the said units-wheel and its cam-flange will ride thereon, (the pawls 58 59 being out of operation during this particular revolution of the units-wheel,) gradually lowering the rack and valve stem and allowing the valve to gradually approach its seat until the gas is entirely cut off, which will take place at the time the shoulder 78 reaches the arm 53, as illustrated in Fig. 5.

If desired, one or more undulations 79 may be formed on the edge of the cam 73, as illustrated in Fig. 10, adjacent to the shoulder 78, the function of which will be, by alternately raising and dropping the rack, valve-stem, and valve, to alternately "flash" and "dim" the jets at the several burners connected to the meter and so call attention to their approaching extinction more vividly than would their gradual diminution.

On the shaft 72, to which the units-wheel 6 is attached, is placed a hand or pointer 80, which, in connection with the circular index or dial 81, indicates the progressive consumption of each coin's equivalent in gas.

The dial may be appropriately numbered to indicate either the number of cubic feet of gas delivered for each coin or the subdivisions of the coin employed.

Another hand or pointer 82, in connection with the index or scale 83, serves as a coin-counter, indicating to the purchaser the number of coins inserted at any one time, and from time to time indicating the number of coins or their equivalent in gas remaining to his credit and yet to be delivered before the closing of the valve. This pointer 82 is connected by a bent rod or wire 83ª to the valve-controlling rack 12, as indicated clearly in Fig. 8, so as to partake of its movement in each direction, each subdivision or mark on the scale 83 indicating a corresponding notch or tooth 36 or 57 on the rack.

Without departing from the spirit of my invention, I may connect the valve-stem 10 directly to the valve-controlling rack 12, as shown in Fig. 14, in which case I employ a stuffing-box 84 in place of the flexible diaphragm 60, and omit the spring 64 and the slotted terminal 63. In this modification the valve 62 will travel the same distance as the rack 12, instead of the distance of one notch or tooth 36, as heretofore described.

In the modified form of construction shown in Fig. 15 the valve-controlling rack instead of being rectilinear is circular in form, becoming a ratchet-wheel 12ª, fixed on an arbor on the shaft 72 and concentric with the units-wheel 6, and is provided with a coiled spring 85, which is of less power than the spring 44 and which returns the valve-controlling rack 12ª to its valve-closing position (the position shown in Fig. 15) as tentatively released by the successive action of the two pawls 58 59 as they are successively tripped by the projection 74 in the course of the independent revolution of the units-wheel 6. In this construction the valve is opened by spring 86, which is of less power than the spring 85, and it is closed by the impingement of the pin 87 (affixed to the circular valve-controlling rack 12$^a$) upon the hook 88 at the inner end of the valve-stem 10, and the valve-opening pawl 13$^b$ operates horizontally, by means of the pivoted link 13$^a$, against the teeth 36 of the circular valve-controlling rack 12$^a$ and compresses or partially winds up the coiled spring 85. In this construction a pointer connected with the arbor bearing the circular rack 12$^a$ will indicate in front of a suitably-graduated circular scale the number of coins at any time to the purchaser's credit, the markings on the scale corresponding to the teeth on the circular rack. The pointer 80 on the shaft 72, indicating the progress of the consumption of each coin's equivalent in gas, may be retained in connection with a concentric scale, the two pointers operating like the hour and minute hands of a clock, or the pointer 80 may be dispensed with.

In the modified form of construction shown in Figs. 16 and 17 the power for moving the valve-controlling rack in the valve-closing direction is taken from one of the flag-arms or tangent arms 89 of the meter—that is to say, the rod 5 passes through a slot or opening in the flag-arm and is provided on each side of the flag-arm with adjustable nuts 90 91, so that the movement of the flag-arm will properly reciprocate the rod 5. As the flag-arm 89 oscillates several times during the delivery of each cubic foot of gas, (as determined by the pitch of the worm 65,) it is evident that the metric wheel 6 must either be made very large and have its teeth represent each the fraction of a cubic foot of gas or that an intermediate reducing-rack must be employed. In case a units-wheel of large size be employed, as just indicated, the construction would be substantially as shown in Fig. 5, but in case a reducing-rack is employed the construction will be like that shown in Fig. 17. As here shown, the rod 5 inside of the box or casing 3 is provided with a pivoted claw 92, which is urged by spring 93 into engagement with the teeth of the reducing-rack 94. On one face of the rack 94 is formed an eccentric or crank 95, which operates a pawl 96, engaging with the teeth of the units-wheel, so that one revolution of the reducing-rack 94 will rotate the units-wheel 6 the distance of one tooth. The number of teeth on the reducing-rack 94 will be determined by the particular number of oscillations of the flag-arm 89 for a cubic foot or other unit of gas delivered through the meter and the number of such units desired to be delivered for each tooth on the metric wheel 6. Thus, for example, if the passage of one cubic foot of gas through the meter produces nine oscillations of the flag-arm 89 and there are eighteen teeth on the reducing-rack 94, each tooth of the metric wheel 6 will represent two cubic feet of gas, and if there are, for example, twenty-five teeth on the units or metric wheel 6 each tooth 36 on the valve-controlling rack 12 will represent fifty cubic feet of gas, which will in such construction be the equivalent of one coin proper to the machine.

If desired, that portion of the rod 5 which projects into the box or casing 3 may be formed with a locking-shoulder 97 and the upper end of the valve-controlling rack 12 formed with an arm 98, which terminates in a lug 99, adapted, when the last coin's equivalent in gas is consumed, to engage the locking-shoulder 97 and thus prevent the further delivery of gas by locking the meter mechanism either independently of or in conjunction with a valve.

It will be understood that in each of the forms of construction shown the units or metric wheel 6 is adapted to be removed and replaced by a similar wheel having a different number of teeth to correspond with the number of cubic feet or other units of gas to be delivered in exchange for a coin proper to the machine. If such new wheel should in order to accommodate such number of teeth vary in diameter from the original wheel, the difference is taken up by the play of the claw-bearing end of the rod 5 on its pivot, which claw may also be adjusted longitudinally by screwing the same on the screw-threaded end 100 of the rod 5.

Having thus described my invention, what I claim as new, and desire to secure by Letters Patent, is—

1. In a coin-controlled gas-vending machine, a meter-controlling rack, a pair of pawls operating on the same side of said rack, a metric wheel operated by the meter, and means connected to said metric wheel for successively tripping the said pawls; substantially as described.

2. The combination with the meter-controlling rack and a metric wheel operated by the meter, of two pawls on the same side of the rack, one projecting beyond the other, and means operated by said metric wheel for successively tripping said pawls; substantially as described.

3. In a coin-controlled gas-vending machine, a valve-operating rack held to move longitudinally, formed upon one side with valve-opening notches and formed upon the other side with valve-closing notches, a valve-opening pawl, a pair of pawls arranged to engage with the valve-closing notches, and a metric wheel operated by the meter and provided with means for tripping said pair of pawls; substantially as described.

4. In a coin-controlled gas-vending machine, a pivoted coin-carrier formed with channels for temporarily holding a coin therein, a cam for pushing said coin and oscillating said coin-carrier, and a hook arranged to overlap the edge of the coin and to discharge it from said coin-carrier; substantially as described.

5. In a coin-controlled gas-vending machine, a coin-carrier held on stationary pivots and provided with channels for temporarily holding a coin therein, a pair of supports for holding the coin in said carrier, a cam for shoving said coin off from said supports and oscillating said coin-carrier, and a hook arranged to overlap the edge of said coin; substantially as described.

6. In a coin-controlled gas-vending machine, a coin-carrier held on stationary pivots and provided with a valve-opening or meter-releasing lever and formed with channels for temporarily holding a coin therein, a pair of supports for holding the coin in said carrier, a cam for shoving said coin off from said supports and oscillating the coin-carrier, and a hook arranged to overlap the edge of said coin; substantially as described.

7. In a coin-controlled gas-vending machine, a shaft arranged to be rotated through part of a revolution by a knob or crank or handle outside of the box or casing, a spring for completing the revolution, and a hook arranged to span one edge of a coin held in a coin-carrier; substantially as described.

8. In a coin-controlled gas-vending machine, a main casing formed with a coin-slot therein, and having therein a primary coin-retaining chamber open at its bottom, a curtain arranged to be oscillated across said coin-slot and provided with an arm arranged to be oscillated across the bottom of said coin-chamber, in combination with a shaft adapted to be rotated by a crank or handle outside of the said casing and provided with a cam adapted to oscillate said curtain; substantially as and for the purposes specified.

9. In a coin-controlled gas-vending machine, a main casing formed with a coin-slot therein, and having therein a primary coin-retaining chamber open at its bottom, a curtain arranged to be oscillated across said coin-slot and provided with an arm arranged to be oscillated across the bottom of said coin-chamber, the said curtain being also provided with another arm arranged to be acted upon by a projection on a rack operated in one direction step by step on the insertion of coins, and in the opposite direction step by step by the action of meter; substantially as described.

10. In a coin-controlled gas-vending machine, a primary coin-chamber fed from a coin-slot in the casing, and a pivoted curtain provided with an arm or plate for closing the bottom of said chamber, in combination with a cam arranged to move said curtain across said coin-slot and withdraw its said plate or arm from the bottom of said coin-chamber; substantially as described.

11. In a coin-controlled gas-vending machine, a valve-stem formed with a slot at its inner end, a spring connected at one end to said valve-stem, its opposite end resting free at the end of the said slot, in combination with a longitudinally-movable valve-controlling rack formed or provided with an arm or projection for compressing said spring for causing it to open the valve; substantially as described.

12. In a coin-controlled gas-vending machine, a units or metric wheel and a valve-controlling rack in combination with a cam arranged to support said rack and permit it and the valve to move gradually in the valve-closing direction for dimming the lights; substantially as described.

13. In a coin-controlled gas-vending machine, a cam rotated by the meter and provided with undulations on its periphery in combination with a valve-stem arranged to rest upon said cam; substantially as described.

14. In a coin-controlled gas-vending machine, a reciprocating rod loosely connected to one of the flag-arms or tangent arms of the meter, its opposite end reaching into and operating the meter-controlling mechanism; substantially as described.

Signed at New York, county of New York, State of New York, this 21st day of August, 1896.

WESLEY WEBBER.

Witnesses:
 EMILE RIESER,
 HENRY M. GANATT.